(12) United States Patent
Pankratz et al.

(10) Patent No.: US 8,109,154 B2
(45) Date of Patent: Feb. 7, 2012

(54) DUAL-DRIVER VIBRATORY FLOWMETER

(75) Inventors: Anthony William Pankratz, Arvada, CO (US); Roger Scott Loving, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 12/921,183

(22) PCT Filed: Apr. 16, 2008

(86) PCT No.: PCT/US2008/060435
§ 371 (c)(1),
(2), (4) Date: Sep. 7, 2010

(87) PCT Pub. No.: WO2009/120222
PCT Pub. Date: Oct. 1, 2009

(65) Prior Publication Data
US 2011/0016991 A1    Jan. 27, 2011

Related U.S. Application Data

(60) Provisional application No. 61/039,169, filed on Mar. 25, 2008.

(51) Int. Cl.
*G01F 1/84* (2006.01)
(52) U.S. Cl. .................................. 73/861.357
(58) Field of Classification Search ............. 73/861.357, 73/861.356, 861.355
See application file for complete search history.

(56) References Cited

U.S. PATENT DOCUMENTS

| | | | |
|---|---|---|---|
| 4,831,885 A | 5/1989 | Dahlin | |
| 6,092,429 A | 7/2000 | Cunningham et al. | |
| 6,516,674 B1 * | 2/2003 | Poremba | 73/861.357 |
| 6,718,615 B2 * | 4/2004 | Van Cleve et al. | 29/592.1 |
| 7,213,469 B2 * | 5/2007 | Wenger et al. | 73/861.355 |
| 2007/0151368 A1 | 7/2007 | Hussain et al. | |

FOREIGN PATENT DOCUMENTS

EP    1431719 A1    6/2004

* cited by examiner

*Primary Examiner* — Jewel V Thompson
(74) *Attorney, Agent, or Firm* — The Ollila Law Group LLC

(57) ABSTRACT

A dual-driver vibratory flowmeter (100) is provided according to the invention. The dual-driver vibratory flowmeter (100) includes a first flowtube (102A) and a second flowtube (102B) positioned substantially adjacent to the first flowtube (102A). The first and second flowtubes (102A, 102B) include a longitudinal length L. The dual-driver vibratory flowmeter (100) further includes a first driver (121) comprising first and second driver portions (121A, 121B) and affixed to the first and second flowtubes (102A, 102B), with the first driver (121) being located at a third longitudinal location Y along the first and second flowtubes (102A, 102B) and a second driver (122) comprising first and second driver portions (122A, 122B) and affixed to the first and second flowtubes (102A, 102B), with the second driver (122) being located substantially at the third longitudinal location Y and substantially spaced-apart from the first driver (121). The first driver (121) and the second driver (122) vibrate the first and second flowtubes (102A, 102B) substantially in unison.

20 Claims, 3 Drawing Sheets

SECTION AA

DUAL-DRIVER VIBRATORY FLOWMETER

BACKGROUND OF THE INVENTION

1. Field of the Invention

The present invention relates to a vibratory flowmeter, and more particularly, to a dual-driver vibratory flowmeter.

2. Statement of the Problem

Vibrating conduit sensors, such as Coriolis mass flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive a mass flow rate measurement.

Vibratory flow meters are often used for measuring the mass flow rates of flow fluids at relatively low pressures. However, there is a need for mass flow measurement at very high fluid pressures. Under very high fluid pressure conditions, the flow conduits and other flow handling equipment must by constructed to be heavy and strong.

However, such structural strength makes vibration of a flow meter assembly problematic, as a high-pressure flow meter assembly will be substantially rigid. A high-pressure flow meter assembly also makes measuring a response to the vibration hard to quantify, as the vibrational response will be relatively small due to the rigidity. Additionally, the flowtube vibrational frequency will not be highly affected by the fluid density of the flow material due to the ratio of structural mass to non-structural mass, i.e., the mass of the flow fluid is much less than the mass of the flow conduits. With small changes in frequency, the resulting vibrational amplitude and therefore the resulting pick-off voltage will be at a minimum, resulting in a low meter sensitivity. Discrimination of a relatively small pick-off voltage will be more difficult, as the signal-to-noise ratio will be minimal.

ASPECTS OF THE INVENTION

In one aspect of the invention, a dual-driver vibratory flowmeter is provided. The dual-driver vibratory flowmeter comprises a first flowtube and a second flowtube positioned substantially adjacent to the first flowtube. The first and second flowtubes include a longitudinal length L. The dual-driver vibratory flowmeter further comprises a first driver comprising first and second driver portions and affixed to the first and second flowtubes, with the first driver being located at a third longitudinal location Y along the first and second flowtubes and a second driver comprising first and second driver portions and affixed to the first and second flowtubes, with the second driver being located substantially at the third longitudinal location Y and substantially spaced-apart from the first driver. The first driver and the second driver vibrate the first and second flowtubes substantially in unison.

Preferably, the first driver and the second driver are substantially mass-balanced with respect to the first and second flowtubes.

Preferably, the first driver and the second driver together effectively operate on about a center of the first and second flowtubes.

Preferably, the first driver and the second driver are substantially diametrically opposed on the first and second flowtubes at the third longitudinal location Y.

Preferably, the first driver and the second driver together effectively operate on about a center of the first and second flowtubes, wherein the first driver is attached to and extends from a substantially top region of the first and second flowtubes and the second driver is attached to and extends from a substantially bottom region of the first and second flowtubes.

Preferably, the first driver and the second driver together effectively operate on about a center of the first and second flowtubes, wherein the first driver is attached to and extends from a substantially top region of the first and second flowtubes and the second driver is attached to and extends from a substantially bottom region of the first and second flowtubes, wherein the first driver and the second driver expand and contract substantially in unison in order to move the first and second flowtubes together and apart in an oppositional vibratory motion.

Preferably, the first driver portion of the first driver is at least partially hollow and wherein the second driver portion at least partially moves into the hollow when the first driver portion and the second driver portion are moving together and wherein the first driver portion of the second driver is at least partially hollow and wherein the second driver portion at least partially moves into the hollow when the first driver portion and the second driver portion are moving together.

In one aspect of the invention, a dual-driver vibratory flowmeter is provided. The dual-driver vibratory flowmeter comprises a first flowtube and a second flowtube positioned substantially adjacent to the first flowtube. The first and second flowtubes include a longitudinal length L. The dual-driver vibratory flowmeter further comprises a first driver comprising first and second driver portions and affixed to the first and second flowtubes, with the first driver being located at a third longitudinal location Y along the first and second flowtubes and attached to and extending from a substantially top region of the first and second flowtubes and a second driver comprising first and second driver portions and affixed to the first and second flowtubes, with the second driver being located substantially at the third longitudinal location Y and substantially spaced-apart from the first driver and attached to and extending from a substantially bottom region of the first and second flowtube. The first driver and the second driver vibrate the first and second flowtubes substantially in unison.

Preferably, the first driver and the second driver are substantially mass-balanced with respect to the first and second flowtubes.

Preferably, the first driver and the second driver together effectively operate on about a center of the first and second flowtubes.

Preferably, the first driver and the second driver are substantially diametrically opposed on the first and second flowtubes at the third longitudinal location Y.

Preferably, the first driver and the second driver expand and contract substantially in unison in order to move the first and second flowtubes together and apart in an oppositional vibratory motion.

Preferably, the first driver portion of the first driver is at least partially hollow and wherein the second driver portion at least partially moves into the hollow when the first driver portion and the second driver portion are moving together and wherein the first driver portion of the second driver is at least partially hollow and wherein the second driver portion at least partially moves into the hollow when the first driver portion and the second driver portion are moving together.

In one aspect of the invention, a method of vibrating a dual-driver vibratory flowmeter is provided. The method comprises energizing a first driver located at a third longitudinal location Y on a first flowtube and on a second flowtube of the dual-driver vibratory flowmeter. The first and second flowtubes include a longitudinal length L. The method further comprises energizing a second driver located substantially at the third longitudinal location Y on the first flowtube and the second flowtube. The second driver is substantially spaced-apart from the first driver. The first driver and the second driver vibrate the first flowtube and the second flowtube substantially in unison.

Preferably, the first driver and the second driver are substantially mass-balanced with respect to the first and second flowtubes.

Preferably, the first driver and the second driver together effectively operate on about a center of the first and second flowtubes.

Preferably, the first driver and the second driver are substantially diametrically opposed on the first and second flowtubes at the third longitudinal location Y.

Preferably, the first driver and the second driver together effectively operate on about a center of the first and second flowtubes, wherein the first driver is attached to and extends from a substantially top region of the first and second flowtubes and the second driver is attached to and extends from a substantially bottom region of the first and second flowtubes.

Preferably, the first driver and the second driver together effectively operate on about a center of the first and second flowtubes, wherein the first driver is attached to and extends from a substantially top region of the first and second flowtubes and the second driver is attached to and extends from a substantially bottom region of the first and second flowtubes, wherein the first driver and the second driver expand and contract substantially in unison in order to move the first and second flowtubes together and apart in an oppositional vibratory motion.

Preferably, the first driver comprises a first driver portion that is at least partially hollow and wherein a second driver portion at least partially moves into the hollow when the first driver portion and the second driver portion are moving together and wherein the second driver comprises a first driver portion that is at least partially hollow and wherein a second driver portion at least partially moves into the hollow when the first driver portion and the second driver portion are moving together.

DESCRIPTION OF THE DRAWINGS

The same reference number represents the same element on all drawings. It should be understood that the drawings are not necessarily to scale.

DETAILED DESCRIPTION OF THE INVENTION

Figure 1:
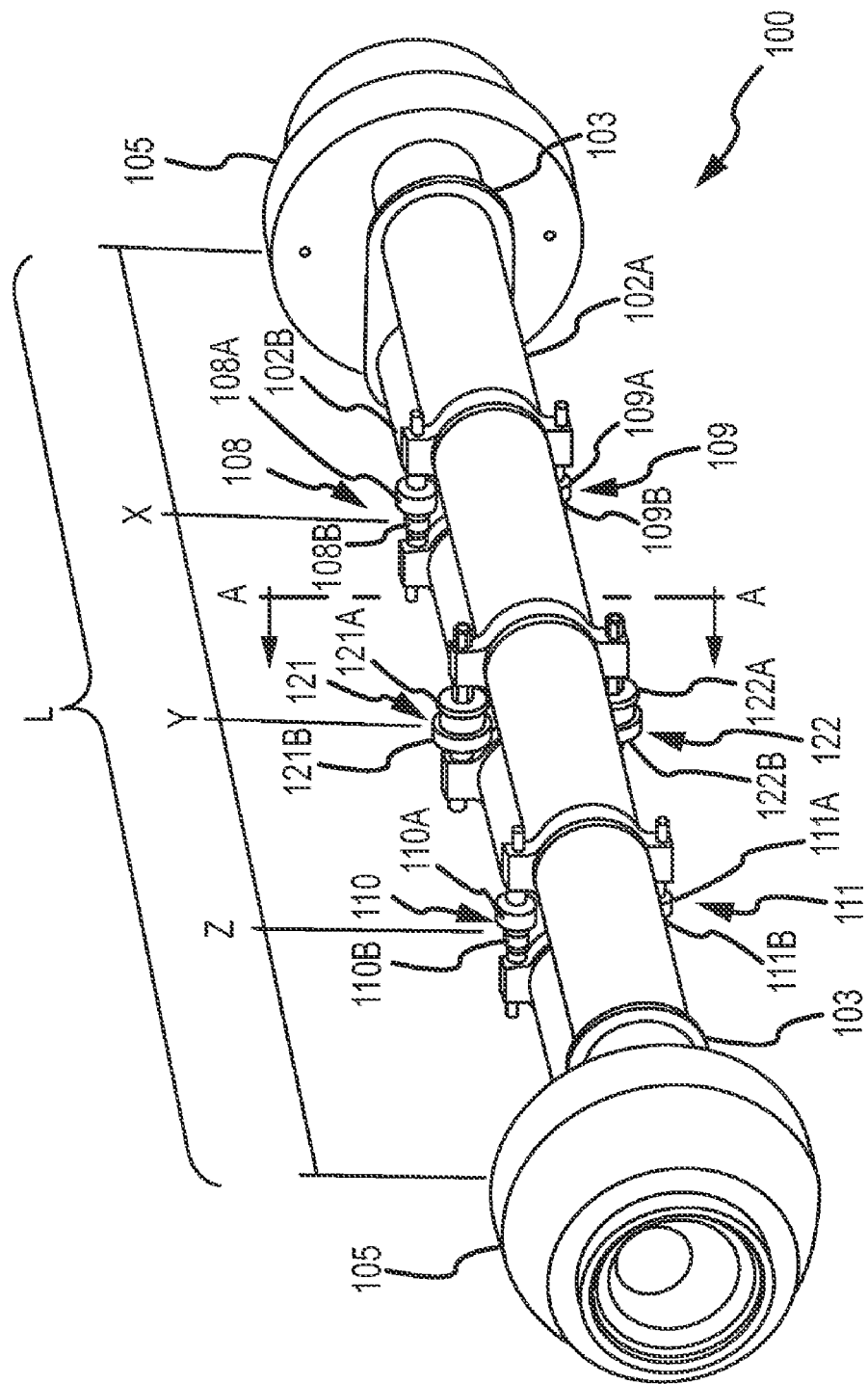
FIG. 1 shows a dual-driver vibratory flowmeter according to an embodiment of the invention.
Figure 2:
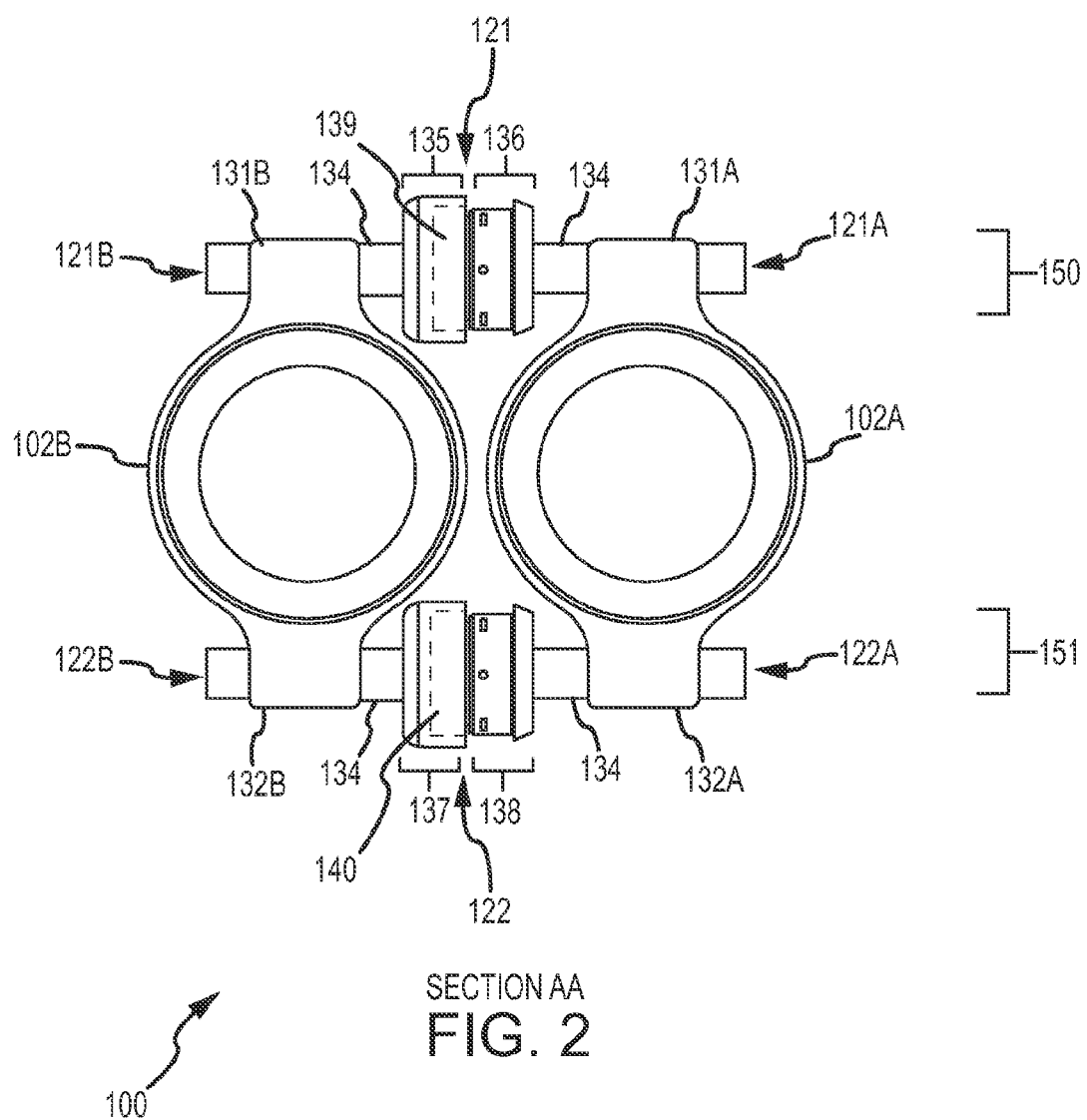
FIG. 2 is a cross-sectional view AA of the dual-driver vibratory flowmeter according to an embodiment of the invention.
Figure 3:
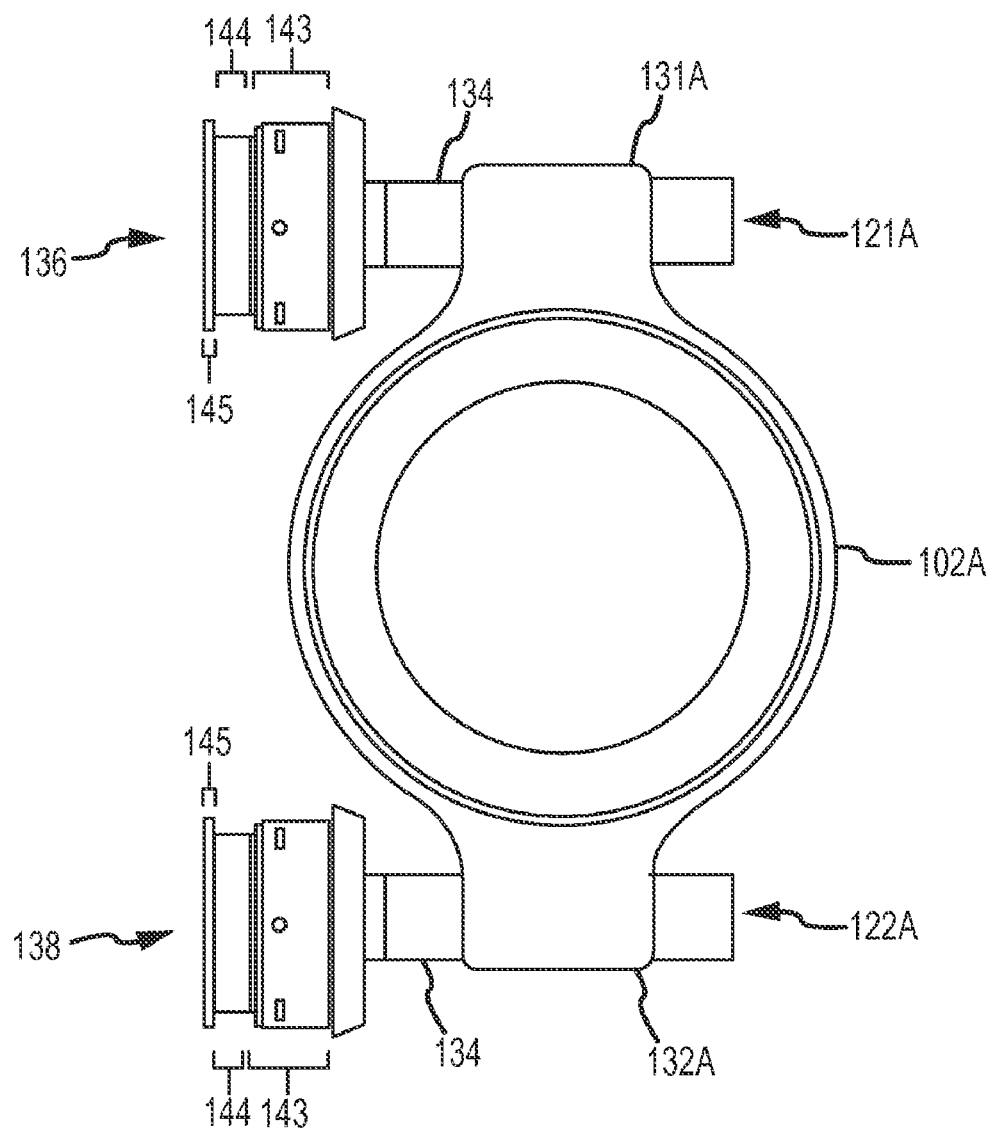
FIG. 3 shows detail of the electromagnets according to an embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows a dual pick-off vibratory flowmeter 100 according to an embodiment of the invention. The dual pick-off vibratory flowmeter 100 can comprise a Coriolis flowmeter, for example. Alternatively, the dual pick-off vibratory flowmeter 100 can comprise a densitometer. The dual pick-off vibratory flowmeter 100 includes a first flowtube 102A and a second flowtube 102B including a longitudinal length L and end elements 105. Brace bars 103 can be affixed to the flowtubes 102A and 102B and can determine some vibrational characteristics of the dual pick-off vibratory flowmeter 100. The end elements 105 can provide an attachment capability to join the dual pick-off vibratory flowmeter 100 to a pipeline or conduit. In addition, the end elements 105 can provide a flow splitting capability in order to divide a fluid flow substantially between the first flowtube 102A and the second flowtube 102B. The dual pick-off vibratory flowmeter 100 further includes pick-off sensors 108-111 and one or more drivers 121, 122.

The vibratory flowmeter 100 can comprise a straight tube vibratory flowmeter, as shown in the figure. Alternatively, the vibratory flowmeter 100 can employ curved or non-straight flowtubes.

The dual pick-off vibratory flowmeter 100 can be designed for high pressure applications and can be constructed with substantially thick conduit walls. As a result, the flowtube stiffness is very high, yielding a low flowtube vibrational amplitude at the pick-offs. Consequently, the deflections of the flowtubes at the pick-off locations are relatively small. In addition, the flowtube natural vibrational frequency (i.e., resonant frequency) is not highly affected by a fluid density of the flow fluid flowing through the flowtubes due to the ratio of structural mass to nonstructural mass. As a result, changes in vibrational frequency per changes in mass flow rate at a pick-off sensor are relatively minimal, resulting in low sensitivity. An associated meter electronics (not shown) may typically require 50 mV of input in order to accurately measure the vibrational frequency. Due to the small vibrational amplitude, very small voltage amplitudes will be output by the pick-off sensors.

One approach in the prior art is to simply amplify the signals from the pick-off sensors. However, there are practical upper limits to amplification, especially in noisy environments. Amplified noise can make discrimination of the pick-off signals difficult or impossible.

The dual pick-off vibratory flowmeter 100 includes a first pick-off sensor 108 and a second pick-off sensor 109 located at a first longitudinal location X along the first and second flowtubes 102A and 102B. The first pick-off sensor 108 comprises first and second pick-off portions 108A and 108B and the second pick-off sensor 109 comprises first and second pick-off portions 109A and 109B. Although both the first pick-off sensor 108 and the second pick-off sensor 109 are located at the first longitudinal location X, the second pick-off sensor 109 is substantially spaced-apart from the first pick-off sensor 108. In some embodiments, the first pick-off sensor 108 and the second pick-off sensor 109 are substantially oppositely located on the two flowtubes 102A and 102B at the first longitudinal location X. In some embodiments, the first pick-off sensor 108 and the second pick-off sensor 109 are substantially diametrically opposed on the two flowtubes 102A and 102B at the first longitudinal location X. In some embodiments, the first pick-off sensor 108 and the second pick-off sensor 109 are attached or affixed to substantially top and bottom regions of the first and second flowtubes 102A and 102B, as shown in the drawing. Consequently, the first pick-off sensor 108 and the second pick-off sensor 109 are substantially diametrically opposed in location.

In addition, the dual pick-off vibratory flowmeter 100 includes a third pick-off sensor 110 and a fourth pick-off sensor 111 located at a second longitudinal location Z along the first and second flowtubes 102A and 102B. The third pick-off sensor 110 comprises first and second pick-off portions 110A and 110B and the fourth pick-off sensor 111 comprises first and second pick-off portions 111A and 111B. The fourth pick-off sensor 111 is located substantially at the second longitudinal location Z and is spaced-apart from the third pick-off sensor 110. In some embodiments, the third pick-off sensor 110 and the fourth pick-off sensor 111 are substantially oppositely located on the two flowtubes 102A and 102B.

The second longitudinal location Z is spaced-apart from the first longitudinal location X. Consequently, the third and fourth pick-off sensors 110 and 111 are longitudinally spaced-apart from the first and second pick-off sensors 108 and 109.

The dual pick-off vibratory flowmeter 100 further includes one or more drivers 121, 122 positioned at a third longitudinal location Y along the first and second flowtubes 102A and 102B. The one or more drivers 121, 122 vibrate the flowtubes 102A, 102B substantially in opposition, alternately moving the flowtubes 102A, 102B toward and away from each other.

In one embodiment, only a single (i.e., first) driver 121 is needed. In such embodiments (not shown), the single driver may be positioned approximately between the first and second flowtubes 102A and 102B, such as in a gap therebetween.

Alternatively, more than one driver may be needed if the flowtubes 102A, 102B are very stiff. For example, two drivers 121 and 122 can be used in order to achieve a desired vibrational amplitude in the first and second flowtubes 102A and 102B. The two drivers 121 and 122 can be located at the same longitudinal location Y and can vibrate the flowtubes 102A and 102B substantially in unison. The two drivers 121 and 122 can therefore move the flowtubes together and apart.

The third longitudinal location Y is spaced-apart from both the first longitudinal location X and the second longitudinal location Z. In some embodiments, the third longitudinal location Y can be substantially centered between the first longitudinal location X and the second longitudinal location Z.

Each pick-off sensor 108-111 comprises two pick-off portions that are coupled to respective flowtubes. The pick-off sensor 108 comprises a first pick-off portion 108A coupled to the first flowtube 102A and a second pick-off portion 108B coupled to the second flowtube 102B. The pick-off sensor 109 comprises a first pick-off portion 109A coupled to the first flowtube 102A and a second pick-off portion 109B coupled to the second flowtube 102B. The pick-off sensor 110 comprises a first pick-off portion 110A coupled to the first flowtube 102A and a second pick-off portion 110B coupled to the second flowtube 102B. The pick-off sensor 111 comprises a first pick-off portion 111A coupled to the first flowtube 102A and a second pick-off portion 111B coupled to the second flowtube 102B.

The oppositional movement of the flowtubes results in the two corresponding pick-off portions moving toward and away from each other, resulting in a relative movement of the two pick-off portions, diverging and converging during vibrations of the flowtubes 102A and 102B. This also results in a generated pick-off voltage signal.

In some embodiments, the first pick-off portions 108A-111A are at least partially hollow and the second pick-off portions 108B-111B at least partially move into the hollow regions 150 when the first pick-off portions 108A-111A and the second pick-off portions 108B-111B are converging. Alternatively, the pick-offs can have other cooperating shapes.

In the embodiment shown in the figure, the dual pick-off vibratory flowmeter 100 includes first and second drivers 121 and 122. The first and second drivers 121 and 122 act together in order to vibrate the flowtubes in opposition. The two drivers combined offer an increased drive power. The first driver 121 comprises a first driver portion 121A coupled to the first flowtube 102A and a second driver portion 121B coupled to the second flowtube 102B. The second driver 122 comprises a first driver portion 122A coupled to the first flowtube 102A and a second driver portion 122B coupled to the second flowtube 102B.

In some embodiments, the first driver portions 121A/122A are at least partially hollow and the second driver portions 121B/122B at least partially move into the hollow regions when the first driver portions 121A/122A and the second driver portions 121B/122B are converging (i.e., they are moving toward each other). Alternatively, the drivers can have other cooperating shapes.

The dual balanced driver arrangement is in contrast to the prior art. In one prior art approach, a single driver is used wherein the two driver components are located to act on the centers of one or two flowtubes. Alternatively, in another prior art driver design, a prior art driver can be offset from a flowtube centerline and consequently can include mass balances on the opposite sides of the flowtubes in order to balance the mass of the two prior art driver components.

The first driver 121 and the second driver 122 are substantially mass-balanced with respect to the first and second flowtubes 102A and 102B. The first driver 121 and the second driver 122 together effectively operate on about a center of the first and second flowtubes 102A and 102B. Consequently, the first driver 121 and the second driver 122 do not place any twisting forces or torques on the first and second flowtubes 102A and 102B. The first driver 121 and the second driver 122 in some embodiments are substantially diametrically opposed on the first and second flowtubes 102A and 102B at the third longitudinal location Y.

In the embodiment shown in the figure, the first driver 121 is attached to and extends from a substantially top region of the first and second flowtubes 102A and 102B. Correspondingly, the second driver 122 is attached to and extends from a substantially bottom region of the first and second flowtubes 102A and 102B. As a result, the first driver 121 and the second driver 122 expand and contract substantially in unison in order to move the first and second flowtubes 102A and 102B together and apart in an oppositional vibratory motion. Further, the substantially balanced arrangement of the drivers 121 and 122 ensures that damping forces are likewise substantially balanced.

FIG. 2 is a cross-sectional view AA of the dual-driver vibratory flowmeter 100 according to an embodiment of the invention. The cross-section AA is taken at the longitudinal position Y in the figure. The cross-section shows the first and second flowtubes 102A and 102B and shows associated mounting elements 131 and 132 extending from the first and second flowtubes 102A and 102B. The mounting elements 131 and 132 enable attachment of the first and second drivers 121 and 122.

The mounting elements 131A and 131B extend from top regions 150 of the first and second flowtubes 102A and 102B, while the mounting elements 132A and 132B extend from bottom regions 151. Consequently, the drivers 121 and 122 effectively operate on the centers of the first and second flowtubes 102A and 102B. However, other locations are contemplated and are within the scope of the description and claims. The top and bottom regions 150 and 151 are labeled merely for illustration, and do not limit the drivers 121 and 122 (or the vibratory flowmeter 100, for that matter) to any particular orientation.

The first and second drivers 121 and 122 in some embodiments comprise mounting extensions 134, permanent magnet portions 135/137, and electromagnet portions 136/138. Consequently, the first driver portion 121A can comprise a mounting extension 134 joined to an electromagnet portion 136 while the second driver portion 121B can comprise a mounting extension 134 joined to a permanent magnet portion 135. The two mounting extensions 134 are affixed to the mounting elements 131A and 131B. The two mounting extensions 134 can be adjustably affixed to the mounting elements 131A and 131B in some embodiments. Likewise, the second driver 122 can comprise a permanent magnet portion 137 joined to a mounting extension and an electromagnet portion 138 joined to a mounting extension 134. Similarly, the two mounting extensions 134 of the second driver 122 are affixed to the mounting elements 132A and 132B. The two mounting extensions 134 of the second driver 122 can be adjustably affixed to the mounting elements 132A and 132B. Consequently, when the electromagnet portions 136 and 138 are actuated, the permanent magnet portions 135 and 137 can be alternatingly attracted and repelled, vibrating the first and second flowtubes 102A and 102B substantially in opposition.

The permanent magnet portions 135 and 137 can include hollows 139 and 140 that receive at least a portion of the electromagnets 136 and 138. Some or all of the permanent magnet portions 135 and 137 can comprise permanent magnets. As a result, the electromagnets 136 and 138 can move at least partially into the hollows 139 and 140 when the two driver portions are moving together. It should be understood that the arrangement of the magnets 135/137 and the electromagnets 136/138 can be swapped and is not limited to the arrangement shown.

FIG. 3 shows detail of the electromagnets 136 and 138 according to an embodiment of the invention. Each of the electromagnets 136 and 136 comprise coil portions 143, standoff portions 144, and flanges 145. The flanges 145 can be designed to closely fit into the hollows 139 and 140 (see FIG. 2). The standoff portions 144 can comprise a magnetizable or magnetically conductive material and can include core portions that extend partially or fully through the coil portions 143. The standoff portions 144 therefore can conduct magnetic flux to the flanges 145. Likewise, the flanges 145 can comprise a magnetizable or magnetically conductive material, wherein the flanges 145, under influence of magnetic flux created by the coils 143, attract or repel the corresponding permanent magnets 135 and 137 in order to vibrate the first and second flowtubes 102A and 102B.

What is claimed is:
1. A dual-driver vibratory flowmeter (100), comprising:
a first flowtube (102A);
a second flowtube (102B) positioned substantially adjacent to the first flowtube (102A), with the first and second flowtubes (102A, 102B) including a longitudinal length L;
a first driver (121) comprising first and second driver portions (121A, 121B) and affixed to the first and second flowtubes (102A, 102B), with the first driver (121) being located at a third longitudinal location Y along the first and second flowtubes (102A, 102B); and
a second driver (122) comprising first and second driver portions (122A, 122B) and affixed to the first and second flowtubes (102A, 102B), with the second driver (122) being located substantially at the third longitudinal location Y and substantially spaced-apart from the first driver (121), wherein the first driver (121) and the second driver (122) vibrate the first and second flowtubes (102A, 102B) substantially in unison.

2. The dual-driver vibratory flowmeter (100) of claim 1, wherein the first driver (121) and the second driver (122) are substantially mass-balanced with respect to the first and second flowtubes (102A, 102B).

3. The dual-driver vibratory flowmeter (100) of claim 1, with the first driver (121) and the second driver (122) together effectively operating on about a center of the first and second flowtubes (102A, 102B).

4. The dual-driver vibratory flowmeter (100) of claim 1, wherein the first driver (121) and the second driver (122) are substantially diametrically opposed on the first and second flowtubes (102A, 102B) at the third longitudinal location Y.

5. The dual-driver vibratory flowmeter (100) of claim 1, with the first driver (121) and the second driver (122) together effectively operating on about a center of the first and second flowtubes (102A, 102B), wherein the first driver (121) is attached to and extends from a substantially top region (150) of the first and second flowtubes (102A, 102B) and the second driver (122) is attached to and extends from a substantially bottom region (151) of the first and second flowtubes (102A, 102B).

6. The dual-driver vibratory flowmeter (100) of claim 1, with the first driver (121) and the second driver (122) together effectively operating on about a center of the first and second flowtubes (102A, 102B), wherein the first driver (121) is attached to and extends from a substantially top region (150) of the first and second flowtubes (102A, 102B) and the second driver (122) is attached to and extends from a substantially bottom region (151) of the first and second flowtubes (102A, 102B), wherein the first driver (121) and the second driver (122) expand and contract substantially in unison in order to move the first and second flowtubes (102A, 102B) together and apart in an oppositional vibratory motion.

7. The dual-driver vibratory flowmeter (100) of claim 1, wherein the first driver portion (121A) of the first driver (121) is at least partially hollow (139) and wherein the second driver portion (121B) at least partially moves into the hollow (139) when the first driver portion (121A) and the second driver portion (121B) are moving together and wherein the first driver portion (122A) of the second driver (122) is at least partially hollow (140) and wherein the second driver portion (122B) at least partially moves into the hollow (140) when the first driver portion (122A) and the second driver portion (122B) are moving together.

8. A dual-driver vibratory flowmeter (100), comprising:
a first flowtube (102A);
a second flowtube (102B) positioned substantially adjacent to the first flowtube (102A), with the first and second flowtubes (102A, 102B) including a longitudinal length L;
a first driver (121) comprising first and second driver portions (121A, 121B) and affixed to the first and second flowtubes (102A, 102B), with the first driver (121) being located at a third longitudinal location Y along the first and second flowtubes (102A, 102B) and attached to and extending from a substantially top region (150) of the first and second flowtubes (102A, 102B); and
a second driver (122) comprising first and second driver portions (122A, 122B) and affixed to the first and second flowtubes (102A, 102B), with the second driver (122) being located substantially at the third longitudinal location Y and substantially spaced-apart from the first driver (121) and attached to and extending from a substantially bottom region (151) of the first and second flowtubes (102A, 102B), wherein the first driver (121) and the second driver (122) vibrate the first and second flowtubes (102A, 102B) substantially in unison.

9. The dual-driver vibratory flowmeter (100) of claim 8, wherein the first driver (121) and the second driver (122) are substantially mass-balanced with respect to the first and second flowtubes (102A, 102B).

10. The dual-driver vibratory flowmeter (100) of claim 8, with the first driver (121) and the second driver (122) together effectively operating on about a center of the first and second flowtubes (102A, 102B).

11. The dual-driver vibratory flowmeter (100) of claim 8, wherein the first driver (121) and the second driver (122) are substantially diametrically opposed on the first and second flowtubes (102A, 102B) at the third longitudinal location Y.

12. The dual-driver vibratory flowmeter (100) of claim 8, wherein the first driver (121) and the second driver (122) expand and contract substantially in unison in order to move the first and second flowtubes (102A, 102B) together and apart in an oppositional vibratory motion.

13. The dual-driver vibratory flowmeter (100) of claim 8, wherein the first driver portion (121A) of the first driver (121) is at least partially hollow (139) and wherein the second driver portion (121B) at least partially moves into the hollow (139) when the first driver portion (121A) and the second driver portion (121B) are moving together and wherein the first driver portion (122A) of the second driver (122) is at least partially hollow (140) and wherein the second driver portion (122B) at least partially moves into the hollow (140) when the first driver portion (122A) and the second driver portion (122B) are moving together.

14. A method of vibrating a dual-driver vibratory flowmeter, the method comprising:
energizing a first driver located at a third longitudinal location Y on a first flowtube and on a second flowtube of the dual-driver vibratory flowmeter, with the first and second flowtubes including a longitudinal length L; and
energizing a second driver located substantially at the third longitudinal location Y on the first flowtube and the second flowtube, wherein the second driver is substantially spaced-apart from the first driver and wherein the first driver and the second driver vibrate the first flowtube and the second flowtube substantially in unison.

15. The method of claim 14, wherein the first driver and the second driver are substantially mass-balanced with respect to the first and second flowtubes.

16. The method of claim 14, with the first driver and the second driver together effectively operating on about a center of the first and second flowtubes.

17. The method of claim 14, wherein the first driver and the second driver are substantially diametrically opposed on the first and second flowtubes at the third longitudinal location Y.

18. The method of claim 14, with the first driver and the second driver together effectively operating on about a center of the first and second flowtubes, wherein the first driver is attached to and extends from a substantially top region of the first and second flowtubes and the second driver is attached to and extends from a substantially bottom region of the first and second flowtubes.

19. The method of claim 14, with the first driver and the second driver together effectively operating on about a center of the first and second flowtubes, wherein the first driver is attached to and extends from a substantially top region of the first and second flowtubes and the second driver is attached to and extends from a substantially bottom region of the first and second flowtubes, wherein the first driver and the second driver expand and contract substantially in unison in order to move the first and second flowtubes together and apart in an oppositional vibratory motion.

20. The method of claim 14, wherein the first driver comprises a first driver portion that is at least partially hollow and wherein a second driver portion at least partially moves into the hollow when the first driver portion and the second driver portion are moving together and wherein the second driver comprises a first driver portion that is at least partially hollow and wherein a second driver portion at least partially moves into the hollow when the first driver portion and the second driver portion are moving together.

* * * * *